No. 821,451. PATENTED MAY 22, 1906.
J. S. BERKEY.
CORN PLANTING MACHINE.
APPLICATION FILED OCT. 31, 1905.
2 SHEETS—SHEET 1.
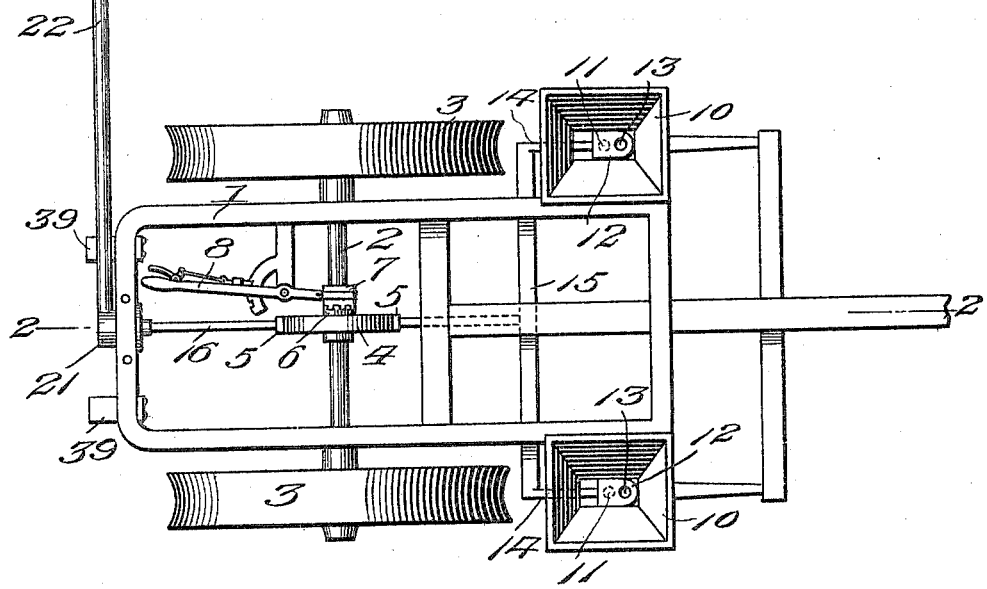
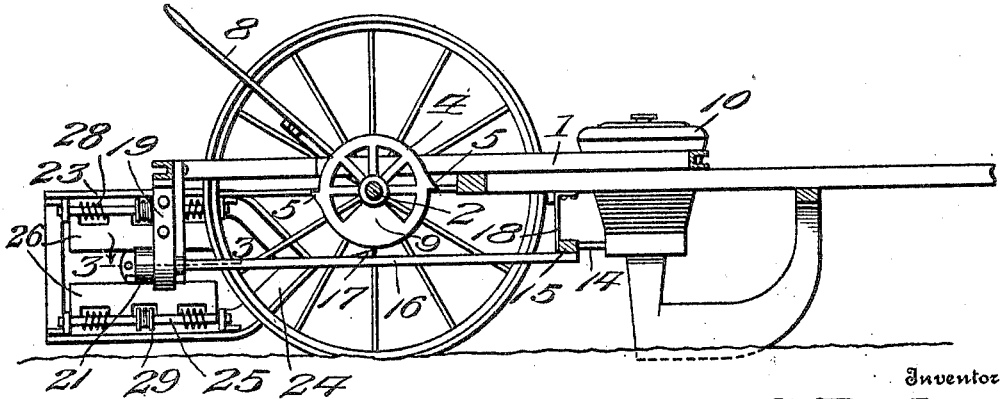
Inventor
Joseph S. Berkey
By Victor J. Evans
Attorney
Witnesses
Edwin F. McKee No. 821,451. PATENTED MAY 22, 1906.
J. S. BERKEY.
CORN PLANTING MACHINE.
APPLICATION FILED OCT. 31, 1905.
2 SHEETS—SHEET 2.
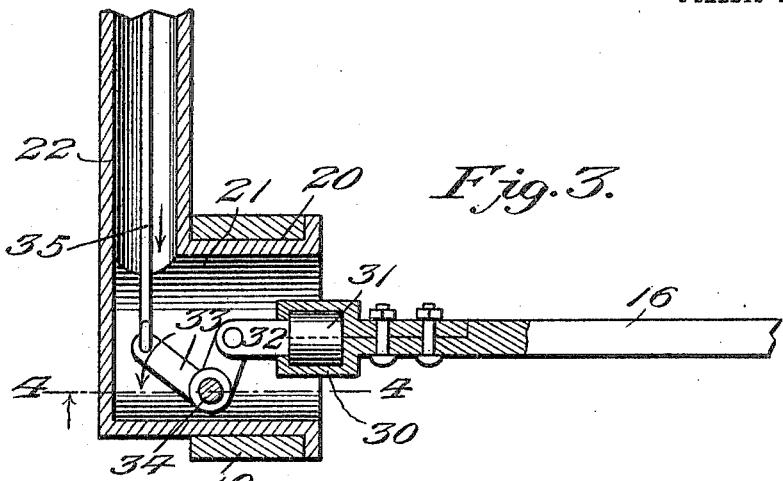
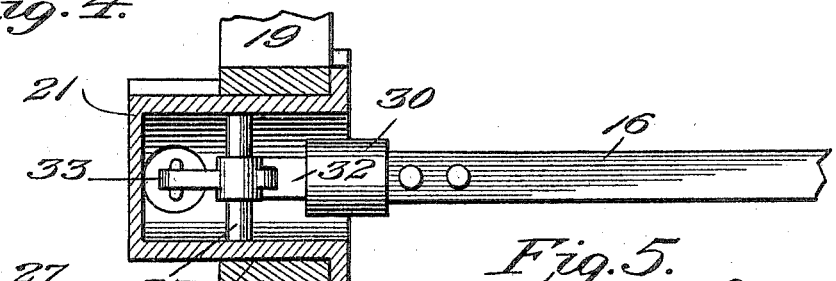
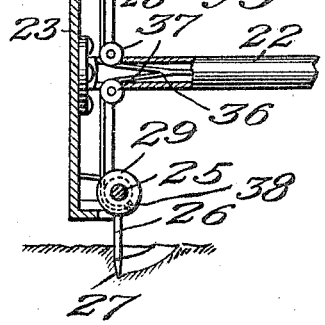
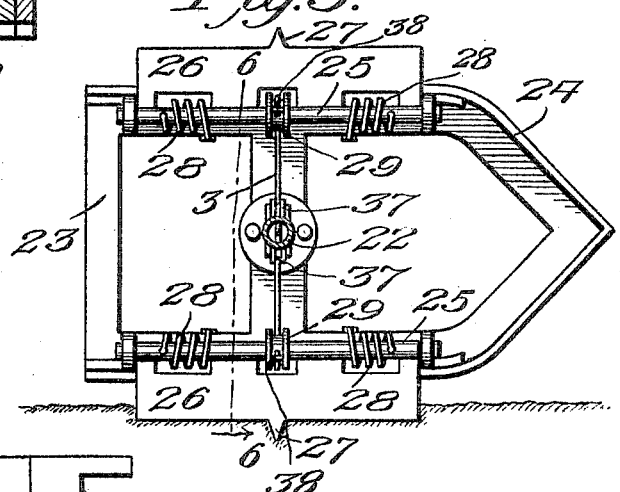
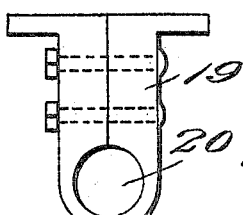
Witnesses
Edwin G. McKee
F. A. Elmore
Inventor
Joseph S. Berkey
By Victor J. Evans
Attorney

UNITED STATES PATENT OFFICE.

JOSEPH S. BERKEY, OF WEILERSVILLE, OHIO.

CORN-PLANTING MACHINE.

No. 821,451.    Specification of Letters Patent.    Patented May 22, 1906.

Application filed October 31, 1905. Serial No. 285,305.

*To all whom it may concern:*

Be it known that I, JOSEPH S. BERKEY, a citizen of the United States, residing at Weilersville, in the county of Wayne and State of Ohio, have invented new and useful Improvements in Corn-Planting Machines, of which the following is a specification.

This invention relates to corn-planting machines of the check-row type, and has for its objects to produce a comparatively simple inexpensive device of this character which will obviate the employment of the ordinary check-lines, one whereby the ground will be properly and evenly marked to insure proper planting of the corn in straight rows, and one wherein the corn dropping and checking devices will be simultaneously operated through the medium of a common actuating mechanism.

With these and other objects in view the invention comprises the novel features of construction and combination of parts more fully hereinafter described.

In the accompanying drawings, Figure 1 is a top plan view of a machine embodying the invention. Fig. 2 is a vertical longitudinal section taken on the line 2 2 of Fig. 1. Fig. 3 is a horizontal section taken on the line 3 3 of Fig. 2 and showing the parts on an enlarged scale. Fig. 4 is a detail section taken on the line 4 4 of Fig. 3. Fig. 5 is a side elevation, on an enlarged scale, of the checking device, showing the supporting-arm in section and the marking members in active position. Fig. 6 is a detail sectional view taken on the line 6 6 of Fig. 5, and Fig. 7 is a detail elevation of the bearing-hanger.

Referring to the drawings, 1 designates the main frame of substantially rectangular form mounted upon the transverse rotary shaft or axle 2, equipped with transporting-wheels 3, adapted in their travel over the ground to impart motion to the shaft, upon which is idly mounted an operating member or wheel 4, having a pair of diametrically-opposed radial projections or teeth 5 and having its head provided with clutch-teeth 6, designed for engagement by corresponding teeth formed on a clutch member or head 7, slidably disposed upon and fixed for rotation with the shaft 2, and adapted for movement into and out of clutch position by means of operating-lever 8, the wheel 4 being weighted at one side, as at 9, whereby it will when the clutch 7 is out of engagement swing automatically and by gravity to normal position with the teeth 5 disposed in a horizontal plane.

Sustained at the front of the frame 1 and respectively at opposite sides of the machine is a pair of seed-hoppers 10, provided with discharge-openings 11, normally closed by dropping members or slides 12, in turn having openings 13 and carried by the forwardly-projecting arms 14 of a bar 15, fixed to the forward end of a longitudinally-slidable actuating member or bar 16, extended centrally and longitudinally through the frame directly beneath the wheel 4 and provided at a point beneath the latter with a projecting portion or tooth 17, designed for operative engagement with either of the teeth 5, there being fixed to the frame 1 a vertically-depending leaf-spring 18, engaged at its lower end behind the bar 15 and acting to maintain the parts in normal condition with the opening 13 in the slides or valves 12 disposed in advance of and out of register with the discharge-openings 11.

Fixed to the rear frame-bar 1 is a bearing member or hanger 19, provided with a circular bearing-opening 20, in which is journaled for rotation the cylindrical tubular head 21, formed upon the inner end of and disposed at right angles to a transversely-extending tubular supporting member or arm 22, communicating at its inner end with the head 21 and having fixed to its outer end a substantially U-shaped marker head or frame 23, disposed vertically on edge and having a pointed forward end 24, there being hinged, respectively, upon the horizontal side bars of the frame 23 rotary shafts or pintles 25, each having fixed thereto a movable marking member or blade 26, provided adjacent the longitudinal center of its outer edge with a pointed projecting portion or lug 27, there being arranged upon each of the pintles 25 a pair of torsion-springs 28, having terminal connection with the adjacent side bars and pintles and tending to rotate the latter in a direction for swinging the wings or blades 26 inward to inactive position, as seen in Fig. 2, there being fixed upon each of the pintles 25 at a point adjacent the longitudinal center thereof and for rotation therewith a guide member or roller 29, which when rotated in one direction imparts similar movement to the adjacent pintle and against the action of the springs 28 for swinging the marking members or blades 26 to active projected position, as illustrated in Figs. 5 and 6.

Provided on the rear end of the actuating member 16 is a cylindrical tubular head or socket 30, designed to receive the cylindrical head 31 of a rotary coupling member or arm 32, pivoted to one arm of a bell-crank lever 33, in turn pivoted in the head 21 by means of a transverse pintle or axle 34 and serving in conjunction with the slide-carrying arms 14 to support the bar 16, said lever 33 having its other arm pivotally engaged with a traction element or rod 35, extending through the tubular arm 22 and engaged at its outer end with a pair of flexible traction elements 36, arranged for travel on guide-rollers 37, journaled in the frame 23 and terminally engaged, as at 38, respectively, with the drums 29, whereby movement of the rod 35 in the direction indicated by the arrow in Fig. 3 serves, through the medium of the elements 36, to rotate the pintles or shafts 25 against the action of the springs 28 for moving the members 26 to marking position.

Attached to the rear frame-bar 1 and respectively at opposite sides of the head 21, which constitutes the fulcrum of the arm 22, is a pair of horizontal supporting members or brackets 39, on one of which the arm rests when in active position, it being apparent that owing to the provision of the pair of brackets 39 and the fact that the coupling 32 is rotatively connected with the element 16 the arm 22 may be turned for bringing the marking device into action at either side of the machine, under which conditions one or the other of the marking members or blades 26 will be brought into play.

In practice as the machine advances over the ground motion will be imparted to shaft 2 through the medium of the ground-wheels 3, and when the clutch member 7 is moved into engagement with the wheel 4 the latter will rotate with the shaft, thus bringing the teeth 5 successively into engagement with the tooth 17 for imparting an intermittent rearward movement to the actuating member 16, the return movement of which latter is effected by means of the spring 18. As the member 16 moves rearwardly the openings 13 in the valves 12 are brought into register with the openings 11, thus discharging one or more kernels of corn through the hoppers 10, while at the same time the bell-crank lever 33 is rocked, as indicated by the direction of the arrow in Fig. 3, thus exerting inward traction upon the rod 35 for moving the marking members 26 to active position, as heretofore explained. As soon as one of the teeth 5 has passed over the tooth 17 the members 16 will be returned to normal position by means of spring 18, thus moving the rod 35 outwardly and permitting the return of marking members 26 to normal position under the influence of springs 28. It will be observed that under this construction the dropping and marking or checking operations are simultaneously effected through the medium of a common single actuating member, and, further, that the motion is imparted to the mechanism at predetermined intervals by proper manipulation of the lever 28 to move the clutch 7 into and out of engagement with the operating-wheel 4, which latter will, when released from shaft 2, swing by gravity under the influence of weight 9 to position with the teeth 5 in a horizontal plane, whereby the tooth next moving into action will have a certain amount of movement prior to coming into engagement with the projection or tooth 17.

From the foregoing it is apparent that I produce a simple device admirably adapted for the attainment of the ends in view, it being understood that in attaining these ends minor changes in the details herein set forth may be resorted to without departing from the spirit of the invention.

Having thus fully described my invention, what I claim is—

1. In a corn-planter, a seed-dropping device, a land-marking device, a reciprocatory actuating member common to and for operating said devices, means for positively moving the member in one direction, and means for automatically moving the member in the other direction.

2. In a corn-planter, a seed-dropping device, a land-marking device, a longitudinally-movable actuating member operatively connected with and for operating said devices, a rotary shaft, an operating member designed for rotation therewith and adapted to operate the first-named member, and means for clamping the operating member to or releasing it from the shaft.

3. In a corn-planter, a frame, a rotary axle carried thereby and provided with transporting-wheels, an actuating member slidably sustained in the frame, a tubular supporting member extended transversely from the frame, a marker movably connected with the outer end of the supporting member, a traction element extended through the latter and operatively connected with the marker for moving the same, and operative connections between the element and actuating member.

4. In a corn-planter, a frame provided with an axle and transporting-wheels, an actuating element sustained in the frame, means operated by the wheels for moving the member, a tubular supporting member extended transversely from the frame, a marker-frame carried by the supporting member, a marker movably connected with the rear frame, a traction-rod extended through the supporting member and operatively connected with and for moving the marker, and a bell-crank lever pivotally connected adjacent the inner end of the supporting member and operatively engaged with the element and actuating member.

In testimony whereof I affix my signature in presence of two witnesses.

JOSEPH S. BERKEY.

Witnesses:
  MERL O. PONTIUS,
  CHARLES BAKER.